(12) United States Patent
Dieberger et al.

(10) Patent No.: US 7,716,586 B2
(45) Date of Patent: May 11, 2010

(54) APPARATUS, SYSTEM, AND METHOD FOR PROGRESSIVELY DISCLOSING INFORMATION IN SUPPORT OF INFORMATION TECHNOLOGY SYSTEM VISUALIZATION AND MANAGEMENT

(75) Inventors: Andreas Dieberger, Los Gatos, CA (US); Eser Kandogan, Mountain View, CA (US); Cheryl A. Kieliszewski, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 11/356,582

(22) Filed: Feb. 17, 2006

(65) Prior Publication Data

US 2007/0198929 A1    Aug. 23, 2007

(51) Int. Cl.
 *G06F 15/177* (2006.01)
 *G06F 3/00* (2006.01)
 *G06F 15/16* (2006.01)
 *G06F 15/173* (2006.01)

(52) U.S. Cl. ............... 715/734; 715/736; 715/738; 715/856; 715/854; 709/224; 709/202; 709/223; 345/440; 345/441

(58) Field of Classification Search ............ 715/713, 715/736, 734, 738, 853, 854; 709/224, 202, 709/223; 345/440, 441
See application file for complete search history.

(56) References Cited

U.S. PATENT DOCUMENTS 4,821,211 A     4/1989  Torres ..................... 364/521
5,457,808 A  * 10/1995  Osawa et al. ................ 455/8
5,513,306 A  *  4/1996  Mills et al. ................ 715/202
5,517,494 A  *  5/1996  Green ...................... 370/408
5,541,927 A  *  7/1996  Kristol et al. .............. 370/408

(Continued)

FOREIGN PATENT DOCUMENTS

EP         0030160         12/1980

(Continued)

OTHER PUBLICATIONS

"Progressive Disclosure of User Assistance Information", IBM Technical Disclosure Bulletin, vol. 39, No. 02, Feb. 1996, p. 395.*

(Continued)

*Primary Examiner*—Steven P Sax
*Assistant Examiner*—Linh K Pham
(74) *Attorney, Agent, or Firm*—Kunzler Needham Massey & Thorpe

(57) ABSTRACT

An apparatus, system, and method are disclosed for progressively disclosing information in support of information technology system visualization and management. An organization module establishes a plurality of levels of graphical information for an information technology system comprising a plurality of entities and a plurality of connections between entities, wherein each entity represents one or more sub-entities and is assigned to at least one level and at least one entity class. An assignment module assigns an entity graphical representation to each entity for each assigned level. A display module displays the entity graphical representation for a selected entity with the entity information granularity for a level and a context graphical representation of an adjacent entity relationship. A modification module progressively modifies the information environment in response to a user request.

32 Claims, 15 Drawing Sheets

U.S. PATENT DOCUMENTS

| | | | |
|---|---|---|---|
| 5,606,669 A * | 2/1997 | Bertin et al. | 709/223 |
| 5,751,965 A * | 5/1998 | Mayo et al. | 709/224 |
| 5,758,152 A * | 5/1998 | LeTourneau | 707/102 |
| 5,768,552 A * | 6/1998 | Jacoby | 345/441 |
| 5,774,655 A | 6/1998 | Bloem et al. | 395/200.5 |
| 5,778,187 A * | 7/1998 | Monteiro et al. | 709/231 |
| 5,786,820 A | 7/1998 | Robertson | 345/357 |
| 5,805,167 A | 9/1998 | Van Cruyningen | 345/353 |
| 5,828,838 A * | 10/1998 | Downs et al. | 709/204 |
| 5,831,975 A * | 11/1998 | Chen et al. | 370/256 |
| 5,852,714 A * | 12/1998 | Tseng et al. | 726/5 |
| 5,864,542 A * | 1/1999 | Gupta et al. | 370/257 |
| 5,867,653 A * | 2/1999 | Aras et al. | 709/204 |
| 5,877,766 A * | 3/1999 | Bates et al. | 715/854 |
| 5,892,761 A * | 4/1999 | Stracke, Jr. | 370/395.1 |
| 5,905,871 A * | 5/1999 | Buskens et al. | 709/245 |
| 5,963,547 A * | 10/1999 | O'Neil et al. | 370/260 |
| 5,968,122 A | 10/1999 | Scholosser et al. | 709/223 |
| 6,031,528 A * | 2/2000 | Langfahl, Jr. | 715/734 |
| 6,064,984 A | 5/2000 | Ferguson et al. | 705/36 |
| 6,084,585 A | 7/2000 | Kraft et al. | 345/352 |
| 6,112,181 A * | 8/2000 | Shear et al. | 705/1 |
| 6,128,013 A | 10/2000 | Prabhu et al. | 345/337 |
| 6,154,213 A * | 11/2000 | Rennison et al. | 715/854 |
| 6,154,463 A * | 11/2000 | Aggarwal et al. | 370/408 |
| 6,225,999 B1 | 5/2001 | Jain et al. | 715/734 |
| 6,307,544 B1 | 10/2001 | Harding | 345/338 |
| 6,396,810 B1 * | 5/2002 | Hebel | 370/248 |
| 6,438,110 B1 * | 8/2002 | Rai et al. | 370/254 |
| 6,477,572 B1 * | 11/2002 | Elderton et al. | 709/224 |
| 6,549,932 B1 * | 4/2003 | McNally et al. | 709/202 |
| 6,597,377 B1 * | 7/2003 | MacPhail | 715/738 |
| 6,628,304 B2 * | 9/2003 | Mitchell et al. | 715/734 |
| 6,646,656 B1 * | 11/2003 | Walker et al. | 715/734 |
| 6,687,750 B1 * | 2/2004 | Messinger et al. | 709/224 |
| 6,697,365 B1 * | 2/2004 | Messenger | 370/390 |
| 6,832,271 B1 | 12/2004 | Ivan et al. | 710/15 |
| 6,900,822 B2 * | 5/2005 | Germain et al. | 715/736 |
| 6,952,208 B1 * | 10/2005 | Arquie et al. | 345/440 |
| 7,000,026 B2 * | 2/2006 | Beshai et al. | 709/238 |
| 7,027,448 B2 * | 4/2006 | Feldmann et al. | 370/401 |
| 7,047,306 B2 * | 5/2006 | Zee et al. | 709/231 |
| 7,088,684 B2 * | 8/2006 | Novaes et al. | 370/256 |
| 7,103,054 B2 * | 9/2006 | Novaes | 370/401 |
| 7,203,701 B1 * | 4/2007 | Packebush et al. | 707/103 Y |
| 7,296,082 B2 * | 11/2007 | Leighton et al. | 709/231 |
| 7,310,665 B2 * | 12/2007 | Holler et al. | 709/223 |
| 7,313,611 B1 * | 12/2007 | Jacobs et al. | 709/223 |
| 7,315,516 B2 * | 1/2008 | Byun | 370/255 |
| 2002/0063737 A1 * | 5/2002 | Feig et al. | 345/786 |
| 2002/0073117 A1 | 6/2002 | Newman | 707/513 |
| 2002/0140725 A1 * | 10/2002 | Horii | 345/736 |
| 2002/0163889 A1 * | 11/2002 | Yemini et al. | 370/238 |
| 2003/0020764 A1 * | 1/2003 | Germain et al. | 345/853 |
| 2003/0043200 A1 * | 3/2003 | Faieta et al. | 345/804 |
| 2004/0036716 A1 * | 2/2004 | Jordahl | 345/713 |
| 2004/0059789 A1 * | 3/2004 | Shum | 709/206 |
| 2004/0061701 A1 * | 4/2004 | Arquie et al. | 345/440 |
| 2004/0215764 A1 | 10/2004 | Allen et al. | 709/224 |
| 2004/0261029 A1 * | 12/2004 | Skjaervik | 715/734 |
| 2005/0021748 A1 * | 1/2005 | Garcea et al. | 709/224 |
| 2005/0039132 A1 * | 2/2005 | Germain et al. | 715/736 |
| 2005/0044487 A1 * | 2/2005 | Bellegarda et al. | 715/511 |
| 2005/0081157 A1 | 4/2005 | Clark et al. | 715/736 |
| 2005/0182667 A1 | 8/2005 | Metzger et al. | 705/4 |
| 2007/0198678 A1 * | 8/2007 | Dieberger et al. | 709/223 |

FOREIGN PATENT DOCUMENTS

| | | |
|---|---|---|
| EP | 0292647 | 2/1988 |
| EP | 1586992 | 4/2005 |
| EP | 1591889 | 4/2005 |

OTHER PUBLICATIONS

"Progressive Disclosure of User Assistance Information", IBM Technical Disclosure Bulletin, vol. 39, No. 02, Feb. 1996, p. 395.

* cited by examiner

APPARATUS, SYSTEM, AND METHOD FOR PROGRESSIVELY DISCLOSING INFORMATION IN SUPPORT OF INFORMATION TECHNOLOGY SYSTEM VISUALIZATION AND MANAGEMENT

BACKGROUND OF THE INVENTION

1. Field of the Invention

This invention relates to disclosing information and more particularly relates to progressively disclosing information in support of information technology system visualization and management.

2. Description of the Related Art

Information technology systems are becoming increasingly important to all aspects of organizations. As a result, the size and complexity of many information technology systems are growing rapidly. For example, an information technology system may include data centers at a plurality of sites, with a plurality of high-bandwidth communications channels between each data center. In addition, each data center may include a plurality of devices herein referred to as objects including mainframe computers, servers, data storage libraries, data storage devices, routers, switches, terminals, computer workstations, printers, and the like.

The objects may be interconnected through a plurality of communications channels such as Ethernet networks, token ring networks, Fibre Channel connections such as is defined by the American National Standard Institute of Washington, D.C., point-to-point data buses, and the like. The communications channels are referred to herein as connections. In addition, portions of one or more objects may be organized as logical resources, herein referred to as resources. For example, a storage device such as a hard disk drive may comprise a plurality of logical volumes wherein the storage device is an information technology system object and the logical volumes are information technology system resources.

The interconnections between objects and the partitioning of resources may vary greatly between data centers and among the objects and resources of each data center. As a result, an administrator may have difficulty determining the relationships and/or functions of objects and resources within an information technology system because of the complexity of the information technology system. In addition, the administrator may have more difficulty visualizing how to manage and/or modify the information technology system.

From the foregoing discussion, it should be apparent that a need exists for an apparatus, system, and method that disclose information in support of information technology system visualization and management. Beneficially, such an apparatus, system, and method would display needed information and minimize unneeded information.

SUMMARY OF THE INVENTION

The present invention has been developed in response to the present state of the art, and in particular, in response to the problems and needs in the art that have not yet been fully solved by currently available information disclosure methods. Accordingly, the present invention has been developed to provide an apparatus, system, and method for information disclosure by revealing additional layers of detail in response to a user's request that overcome many or all of the above-discussed shortcomings in the art.

The apparatus to disclose information is provided with a plurality of modules configured to functionally execute the steps of establishing levels, assigning an entity graphical representation, displaying a selected entity graphical representation, and progressively modifying the information environment. These modules in the described embodiments include an organization module, an assignment module, a display module, and a modification module.

The organization module establishes a plurality of levels of graphical information for an information technology system. The information technology system comprises a plurality of entities and a plurality of connections between entities. Each entity represents one or more sub-entities and is assigned to at least one level and at least one entity class. Each level is configured with a specified granularity of entity information. In addition, each entity has a level of finest granularity wherein the entity has no sub-entity.

The assignment module assigns an entity graphical representation to each entity for each assigned level. For example, an entity may have a unique entity graphical representation for each assigned level. The entity graphical representation comprises at least one icon.

The display module displays the entity graphical representation for a selected entity with the entity information granularity for a level and a context graphical representation of an adjacent entity relationship comprising at least one icon. The selected entity graphical representation and context graphical representation comprise an information environment.

The modification module progressively modifies the information environment to reveal additional layers of detail in response to a user request. The apparatus discloses information through the information environment to support the visualization and management of the information technology system.

A system of the present invention is also presented to disclose information. The system may be embodied in an information technology system. In particular, the system, in one embodiment, includes an information technology system and a computer. The computer includes an organization module, an assignment module, a display module, a modification module, and a navigation module.

The information technology system includes a plurality of objects such as servers, routers, storage devices, and the like. Objects of the information technology system may be interconnected through a plurality of connections. Portions of one or more objects may be organized as resources such as logical volumes, blade centers, and the like. As used herein, the term "entity" refers to one or more objects and/or resources.

The computer is in communication with the information technology system. In one embodiment, the information technology system embodies the computer. The computer may execute one or more software processes comprising the organization module, assignment module, display module, modification module, and navigation module. The organization module establishes a plurality of levels of graphical information for an information technology system. The assignment module assigns an entity graphical representation to each entity for each assigned level.

The display module displays the entity graphical representation for a selected entity and a context graphical representation of an adjacent entity relationship. The modification module progressively modifies the information environment in response to a user request. The navigation module navigates to an entity graphical representation of the information environment. The system supports visualization and management of an entity by displaying a selected granularity of information for the entity along with contextual information for interconnected entities.

A method of the present invention is also presented for disclosing information. The method in the disclosed embodiments substantially includes the steps to carry out the functions presented above with respect to the operation of the described apparatus and system. In one embodiment, the method includes establishing levels, assigning an entity graphical representation, displaying a selected entity graphical representation, and progressively modifying the information environment.

An organization module establishes a plurality of levels of graphical information for an information technology system comprising a plurality of entities and a plurality of connections between entities, wherein each entity represents one or more sub-entities and is assigned to at least one level and at least one entity class, and each level is configured with a specified granularity of entity information. An assignment module assigns an entity graphical representation to each entity for each assigned level. The entity graphical representation includes at least one icon.

A display module displays the entity graphical representation for a selected entity with the entity information granularity for a level and a context graphical representation of an adjacent entity relationship. A modification module progressively modifies the information environment in response to a user request. The method discloses information for the information technology system appropriate to a desired granularity and context.

Reference throughout this specification to features, advantages, or similar language does not imply that all of the features and advantages that maybe realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention discloses information about one or more entities of an information technology system appropriate to a selected level and with context information for related and/or interconnected entities. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
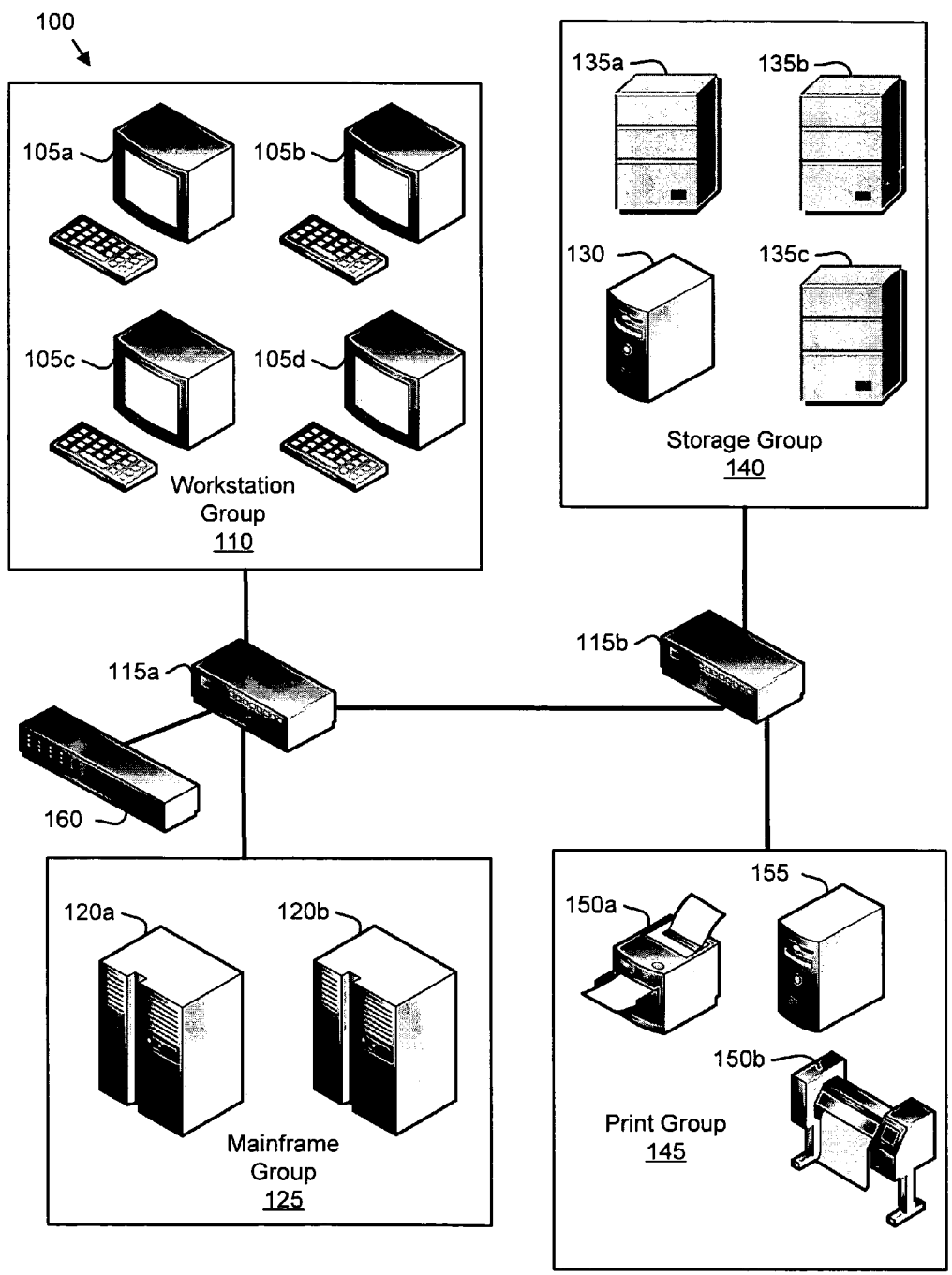
FIG. 1 is a schematic block diagram illustrating one embodiment of a data center in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a data center 100 in accordance with the present invention. The data center 100 includes one or more workstations 105, one or more mainframes 120, one or more storage systems 135, a storage server 130, one or more printers 150, a print server 155, one or more bridges 115, and a router 160. Although for simplicity the data center 100 is depicted with four workstations 105, two mainframes 120, three storage systems 135, one storage server 130, two printers 150, one print server 155, two bridges 115, and one router 160, any number of workstations 105, mainframes 120, storage systems 135, storage servers 130, printers 150, print servers 155, bridges 115, and routers 160 maybe employed.

The workstations 105, mainframes 120, storage systems 135, storage server 130, printers 150, print server 155, bridges 115, and router 160 may be referred to collectively as objects. In addition to the objects depicted, the data center 100 may include servers, hubs, and the like that are omitted for simplicity. The objects of the data center 100 are in communication through a plurality of connections as is well known to those skilled in the art. The connections may be Ethernet networks, token ring networks, fiber optic networks, dedicated data buses, or the like. Although the objects of the data center 100 are depicted as interconnected in a particular configuration, the objects may be interconnected in any configuration.

The workstations 105 may be terminals, computer workstations, laptop computers, personal digital assistants, or the like. A user may employ a workstation 105 for data processing tasks. In one embodiment, the workstations 105 are organized in a workstation group 110. The workstation group 110 is an example of entity class, wherein the entity class is a collection of similar objects. For example, the workstation group 110 maybe an entity class comprising one or more computer workstations and one or more terminals.

The mainframes 120 may perform data processing tasks such as maintaining a database, processing transactions, or the like. For example, a first mainframe 120a may execute a transaction database software application for a user of a first workstation 105a. The mainframes 120 are depicted organized as a mainframe group 125, wherein the mainframe group 125 may be an entity class.

The storage systems 135 may be hard disk drives, data storage libraries, optical storage devices, micromechanical devices, or the like. In one embodiment, each storage system 135 includes one or more storage controllers and one or more storage devices. The storage systems 135 may store data for the workstations 105 and the mainframes 120. The workstations 105 and mainframes 120 may communicate with the storage systems 135 through the storage server 130. The storage systems 135 and storage server 130 are depicted organized as a storage group 140, wherein the storage group 140 may be an entity class.

The printers 150 may print documents for the workstations 105 and the mainframes 120. The workstations 105 and mainframes 120 may submit print jobs to the print server 155 for printing on the printers 150. The printers 150 and print server 155 are depicted organized as a print group 145, wherein the print group may be an entity class.

In addition to the objects, the data center 100 may comprise one or more resources. A resource may be a logical portion of one or more objects as is well known to those skilled in the art. For example, a logical volume may comprise a portion of a first storage system 135a and a second storage system 135b, wherein the logical volume is a resource. Each resource may be logically related to one or more resources.

Figure 2:
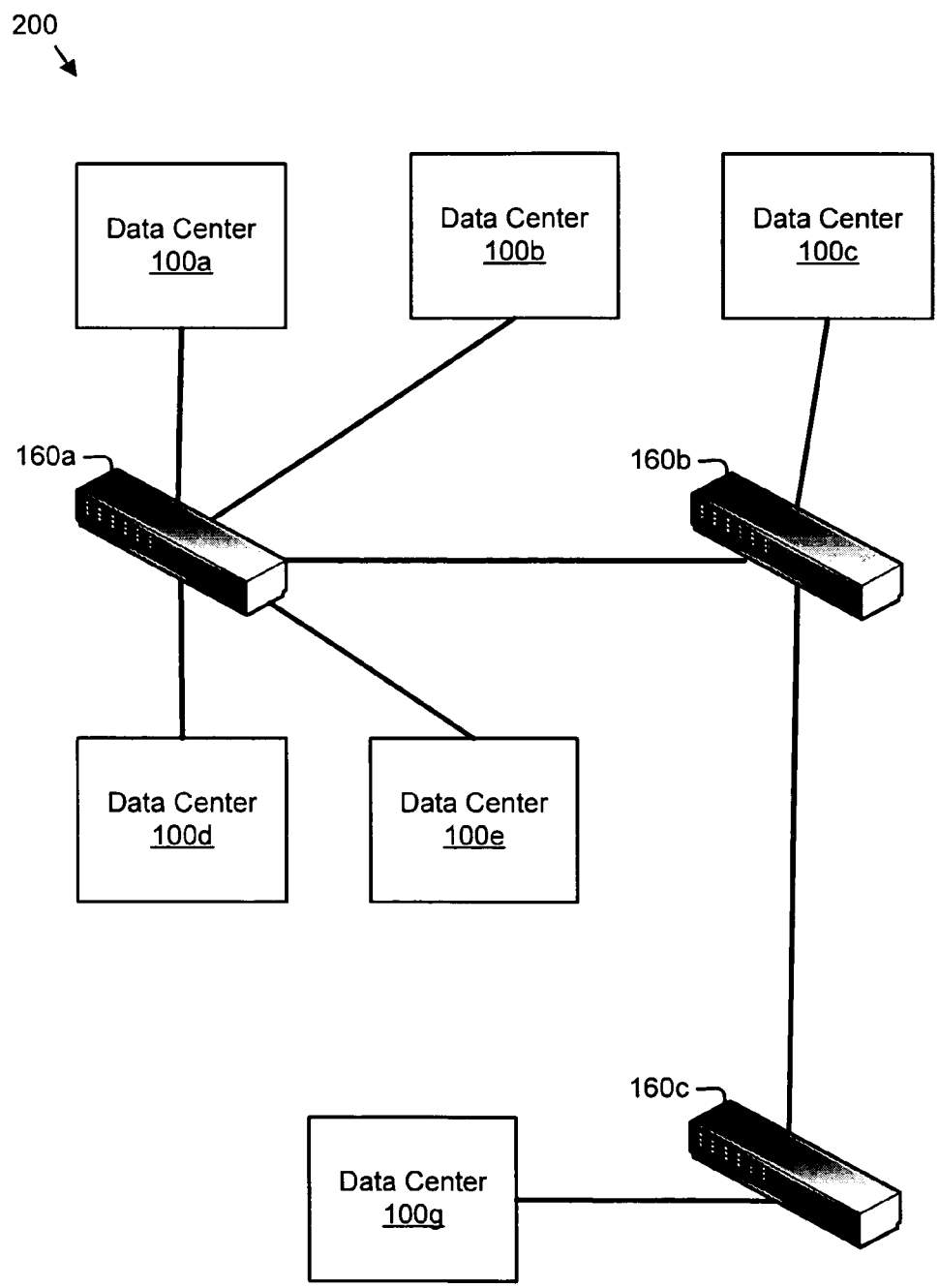
FIG. 2 is a schematic block diagram illustrating one embodiment of an information technology system in accordance with the present invention.

FIG. 2 is a schematic block diagram illustrating one embodiment of an information technology system 200 in accordance with the present invention. The system 200 includes one or more data centers 100 such as the data center 100 depicted in FIG. 1. In addition, the system 200 refers to elements of FIG. 1, like numbers referring to like elements. The data centers 100 are interconnected through connections by a plurality of routers 160.

The system 200 includes a plurality of objects and connections between objects in one or more physical sites. In addition, the system 200 may include a plurality of resources, each with a plurality of logical relationships. The objects and resources, connections and relationships between the objects and resources, and configurations of objects and resources of each data center 100 and between data centers 100 may constantly change. As a result, an administrator of the system 200 requires information about the system 100 of widely varying granularity, including broad, abstract information and detailed information.

For example, the administrator may require data concerning the available data storage capacity for a system 200, as well as communications traffic through a single bridge 115 of a data center 100. The embodiment of the present invention progressively discloses information about the system 100 with information granularities appropriate to administrator's visualization and/or management requirements. The disclosed information is displayed in a manner that maintains the context of objects and/or resources disclosed with particular detail with connected objects and/or resources.

Figure 3:
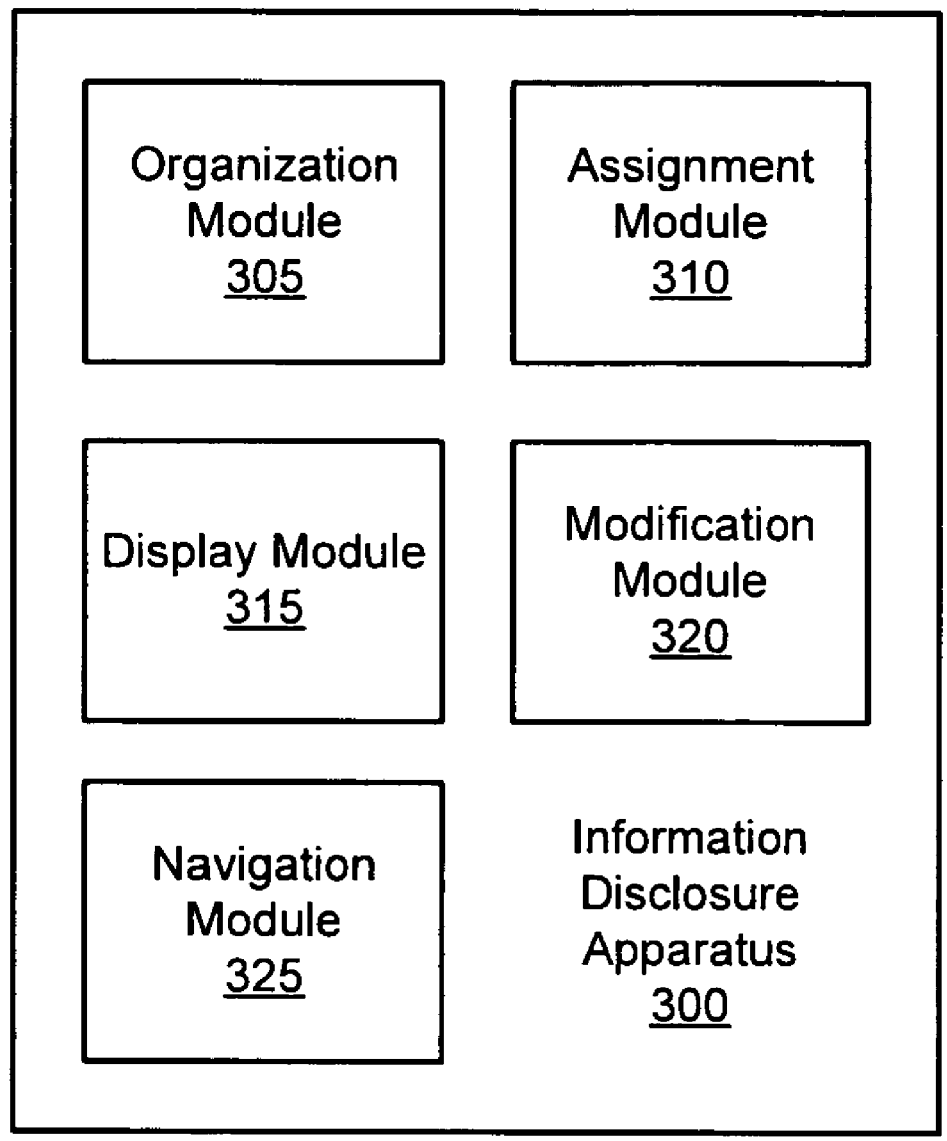
FIG. 3 is a schematic block diagram illustrating one embodiment of an information disclosure apparatus of the present invention.

FIG. 3 is a schematic block diagram illustrating one embodiment of an information disclosure apparatus 300 of the present invention. One or more objects of the data center 100 and the information technology system 200 may embody the apparatus 300. For example, the apparatus 300 may be embodied by a workstation 105. The description of the apparatus 300 refers to elements of FIGS. 1-2, like numbers referring to like elements. The apparatus 300 includes an organization module 305, assignment module 310, display module 315, modification module 320, and navigation module 325.

The organization module 305 establishes a plurality of levels of graphical information (referred to herein as levels) for entities of the information technology system 200 as will be described hereafter. An entity may be one or more objects and/or one or more resources. Each level within the information technology system 200 is configured with a specified granularity of entity information.

The assignment module 310 assigns an entity graphical representation to each entity for each assigned level as will be described hereafter. An entity may have a unique entity graphical representation for each assigned level. Alternatively, the entity may employ the entity graphical representation for two or more levels.

The display module 315 displays the entity graphical representation for a selected entity with the entity information granularity for a selected level and a context graphical representation of an adjacent entity relationship with a connected entity as will be described hereafter. The selected entity graphical representation and context graphical representation comprise an information environment.

The modification module 320 progressively modifies the information environment in response to a user request as will be described hereafter. In one embodiment, the navigation module 325 navigates to an entity graphical representation of the information environment as will be described hereafter. The apparatus 300 allows the user to access information regarding any entity of the information technology system 200 and to access the information with a desired granularity.

Figure 4:
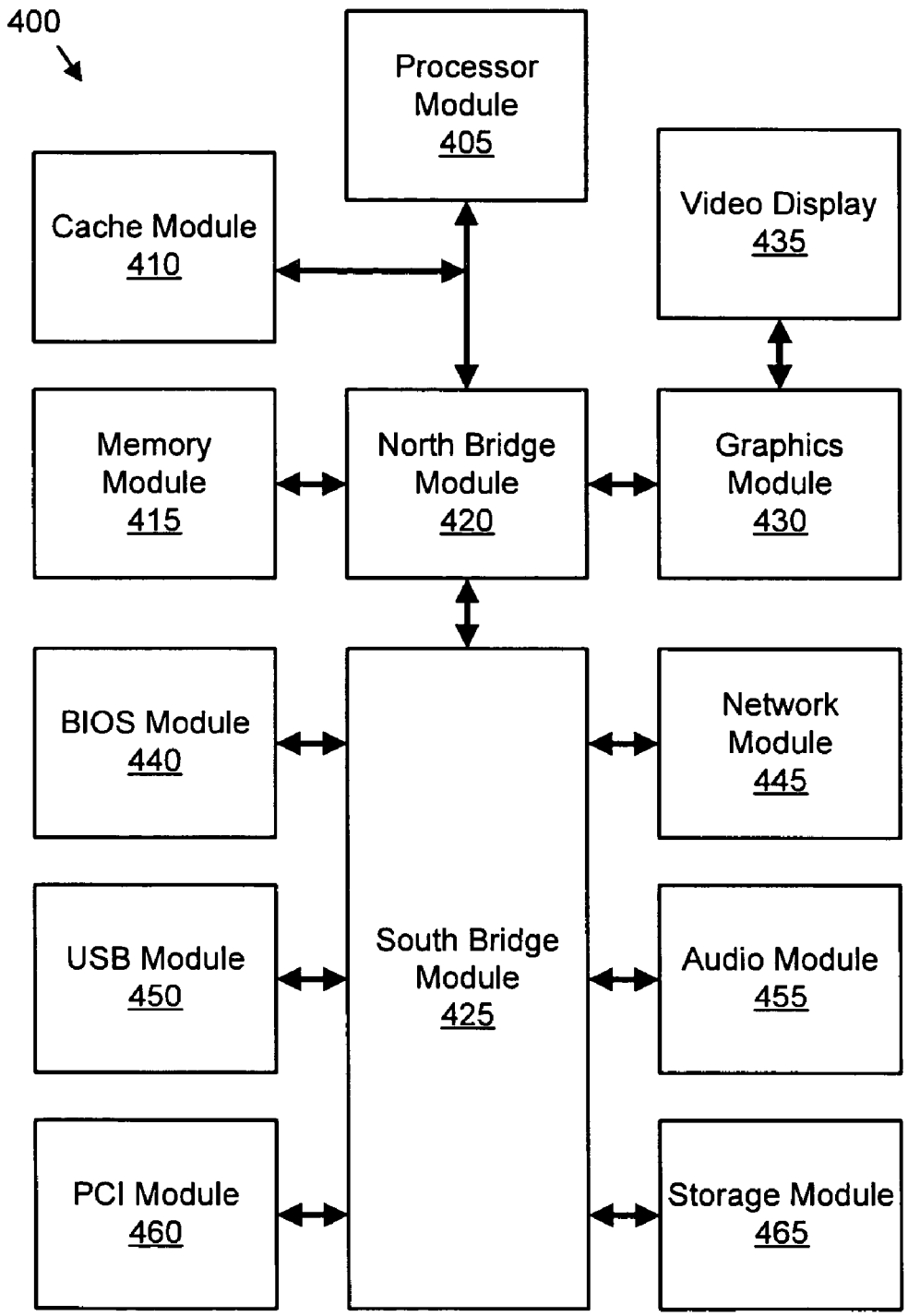
FIG. 4 is a schematic block diagram illustrating one embodiment of a computer of the present invention.

FIG. 4 is a schematic block diagram illustrating one embodiment of a computer 400 of the present invention. The computer 400 includes a processor module 405, a cache module 410, a memory module 415, a north bridge module 420, a south bridge module 425, a graphics module 430, a video display 435, a basic input/output system ("BIOS") module 440, a network module 445, a universal serial bus ("USB") module 450, an audio module 455, a peripheral component interconnect ("PCI") module 460, and a storage module 465. The computer 400 may be a workstation 105 of FIG. 1. The description of the computer 400 may refer to elements of FIGS. 1-3, like numbers referring to like elements.

The processor module 405, cache module 410, memory module 415, north bridge module 420, south bridge module 425, graphics module 430, video display 435, BIOS module 440, network module 445, USB module 450, audio module 455, PCI module 460, and storage module 465, referred to herein as components, may communicate by electrical signals to process software instructions and data as is well known to those skilled in the art. The components may be fabricated of semiconductor gates on one or more semiconductor substrates. Each semiconductor substrate may be packaged in one or more semiconductor devices mounted on circuit cards. Connections between the components may be through semiconductor metal layers, substrate to substrate wiring, or circuit card traces or wires connecting the semiconductor devices.

The memory module 415 stores software instructions and data. The processor module 405 executes the software instructions and manipulates the data as is well know to those skilled in the art. In one embodiment, the memory module 415 stores and the processor module 405 executes one or more software processes comprising the organization module 305, assignment module 310, display module 315, modification module 320, and navigation module 325 of FIG. 3.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
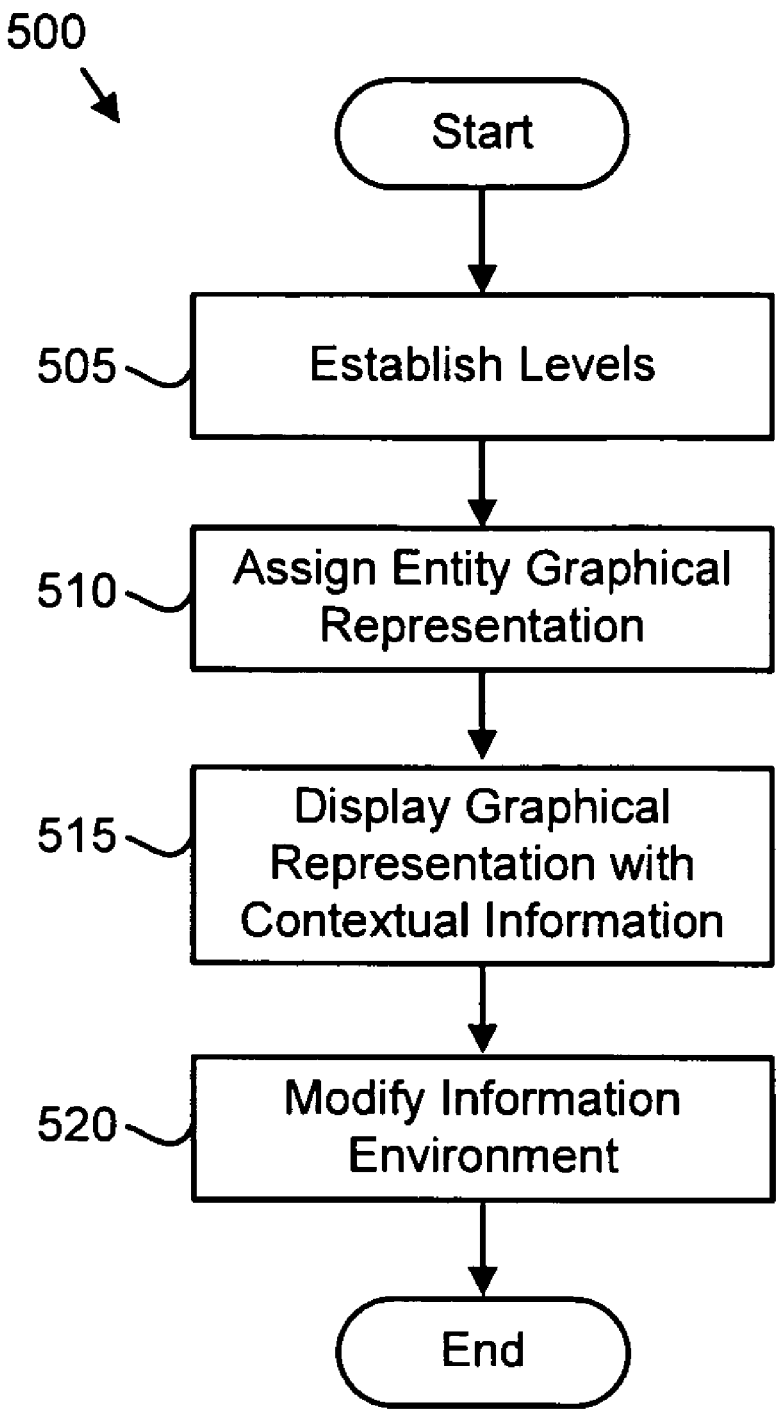
FIG. 5 is a schematic flow chart diagram illustrating one embodiment of an information disclosure method of the present invention.

FIG. 5 is a schematic flow chart diagram illustrating one embodiment of an information disclosure method 500 of the present invention. The method 500 substantially includes the steps to carry out the functions presented above with respect to the operation of the described apparatus 300, 400, and systems 100, 200, of FIGS. 1-4. In addition, the method 500 refers to elements of FIGS. 1-4, like numbers referring to like elements.

The method 500 begins and the organization module 305 establishes 505 a plurality of levels of graphical information for the information technology system 200. The information technology system 200 includes a plurality of entities and a plurality of connections between the entities. For example, the information technology system 200 may include a plurality of data centers 100, wherein each data center 100 includes a plurality of data processing objects such as main frames 120 and a plurality of resources such as logical volumes.

Each entity is assigned to at least one level. Each level is configured with a specified granularity of entity information. For example, a first level may include high-level information for the data center 100 such as location, operational status, and data throughput. In one embodiment, a second level may include high-level information for one or more groups with a data center 100 such as the storage group 140. For example, the second level may disclose information on the number and type of storage systems 135 and storage servers 130 in the storage group 140.

An entity on a higher level may represent one or more sub-entities on a lower level. For example, the storage group 140 of FIG. 1 may be an entity. In addition, the entity of the storage group 140 may include one or more sub-entities such as the storage systems 135 and the storage server 130. Each storage system 135 may represent one or more sub-entities such as a storage controller and a plurality of storage devices such as hard disk drives.

Each entity has a level of finest granularity wherein the entity has no sub-entity. For example, a hard disk drive may represent an entity with no sub-entities. Thus, the hard disk drive may be on a level of finest granularity for the entity of the storage group 140. In one embodiment, discrete objects such as hard disk drives, printers 150, and the like as well as basic resources such as a logical volume and a logical port are assigned to a level of finest granularity.

Each entity is assigned to at least one entity class. In one embodiment, the entity class may include one or more similar entities such as storage systems 135 and/or printers 150. In an alternate embodiment, the entity class embodies one or more logically associated entities such as the storage systems 135 and storage server 130 of the storage group 140.

The assignment module 310 assigns 510 an entity graphical representation to each entity for each assigned level. The entity graphical representation includes at least one icon. For example, each storage system 135 may be represented by an enclosure such as illustrated in FIG. 1. In one embodiment, a single icon may represent a plurality of entities. For example, an icon for the storage system 135 may represent one or more storage controllers and one or more hard disk drives.

The display module 315 displays 515 the entity graphical representation for a selected entity. The user may select the entity be indicating the entity on the video display 435 and issuing a directive selecting the entity. For example, the user may position a cursor over an entity graphical representation on the video display 435 using a mouse and may click a mouse button to complete the selection of the entity. Alternatively, the user may select the entity using a device configured to support audio or voice input, visual area-of-interest determined by where the user is looking on a video display 435, or a haptic device such as a touch-screen video display 435.

The display module 315 displays 515 the entity graphical representation with the entity information granularity for a specified level. For example, if the user selects a data center 100, the display module 315 displays 515 the entity graphical representation for a data center level on the video display 435. In one embodiment, the entity graphical representation for the data center 100 may be similar to FIG. 1.

The display module 315 also displays 515 a context graphical representation of an adjacent entity relationship. The context graphical representation allows the user to view information on the selected entity in the context of the larger information technology system 200. For example, the context graphical representation may disclose information as an information environment regarding connections of the first data center 100a of FIG. 1 in the context of communications between the first data center 100a and other entities of the information technology system 200. The information environment may include both grouped and individual entities.

In one embodiment, the display module 315 displays 515 a context graphical representation of each entity with a direct relationship with the selected entity. For example, if the selected entity is the first data center 100a of FIG. 1, the display module 315 may display 515 the first data center 100a and the first router 160a in communication with the first data center 100a.

The context graphical representation of the adjacent entity relationship may identify the adjacent entity and the nature of the communications between the adjacent entity and the selected entity. Thus, the user is not restricted to receiving information on the selected entity, but may also receive information on the selected entity in the context of the related entities, increasing the relevance of the information disclosure.

In one embodiment, the levels comprise a global level with an entity information granularity that provides abstracted information for a group of entities. The group of entities may be an entity class. For example, the global level may display brief, abstracted information for the mainframe group 125 of FIG. 1. The levels may also include an ambient level with an entity information granularity that provides abstracted information for groups of entities within a given entity class. For example, the ambient level may display abstracted information for entities in a storage entity class such as the storage server 130 and storage systems 135. In an alternate embodiment, the levels comprise a properties level with an entity information granularity that provides detailed information about each entity and minimal abstraction. For example the properties level may display detailed information about each mainframe 120 in the mainframe group 125.

In one embodiment, the levels comprise an orbital level with an entity information granularity that provides abstracted information for a group of entities and the immediate information environment. For example, the orbital level may display brief, abstracted information about each mainframe 120 in the mainframe group 125, as well as the first bridge 115a of the data center 100, wherein the first bridge 115a is included in the immediate information environment for the mainframe group 125 as an adjacent entity.

In one embodiment, the levels comprise a context level with an entity information granularity that provides abstracted information for entities in a group of entities. For example, the context level may display brief, abstracted information for each mainframe 120 of the mainframe group 125. In addition, the levels may comprise a case level with an entity information granularity that provides relationship information for entities in a group of entities. For example, the case level may display connections between the mainframes 120 of the mainframe group 125.

The modification module 320 progressively modifies 520 the information environment in response to a user request. In one embodiment, the modification module 320 modifies 520 the information environment in response to a user request such as the selection of an entity. For example, the user may position a cursor over an entity graphical representation and complete the request by selecting the entity which, in turn, provides more detailed information to the user with respect to the selected entity via a modified information environment.

The modification module 320 may also modify 520 the information environment in response to a user information query. As used herein, the user information query indicates an entity without explicitly selecting the entity. For example, the user may position the cursor over the entity without selecting the entity, a procedure referred to herein as cursor hover. Alternatively, the user information query may be a voice command and the user may indicate the entity by speaking the entities name, a haptic command. The user may also indicate the entity by a touch, or a visual command and the user may indicate the entity by an eye glance.

In one embodiment, a visual area-of-interest device determines where the user is looking on the video display 435 as is well known to those skilled in the art. The visual area-of-interest device may indicate an entity if the user views the entity for a specified time interval such as two seconds (2 s) or blink behavior. In an alternate embodiment, the user may indicate a user information query through a haptic indication such as touching the displayed entity on a touch-screen video display 435.

In one embodiment, the navigation module 325 interprets one or more user selections and one or more user information queries to indicate a desired modification for the modification module 320. For example, the navigation module 325 may interpret the selection of an entity as a directive to modify the information environment to display an entity graphical representation of the entity for a lower level and communicate the directive to the modification module 320.

The modification module 320 modifies 520 the information environment and in one embodiment, the method 500 terminates. In an alternate embodiment, the method 500 loops to display 515 an entity graphical representation for a selected entity in a context graphical representation. The method 500 discloses information for the information technology system 200 appropriate to a desired granularity and context.

Figure 6A:
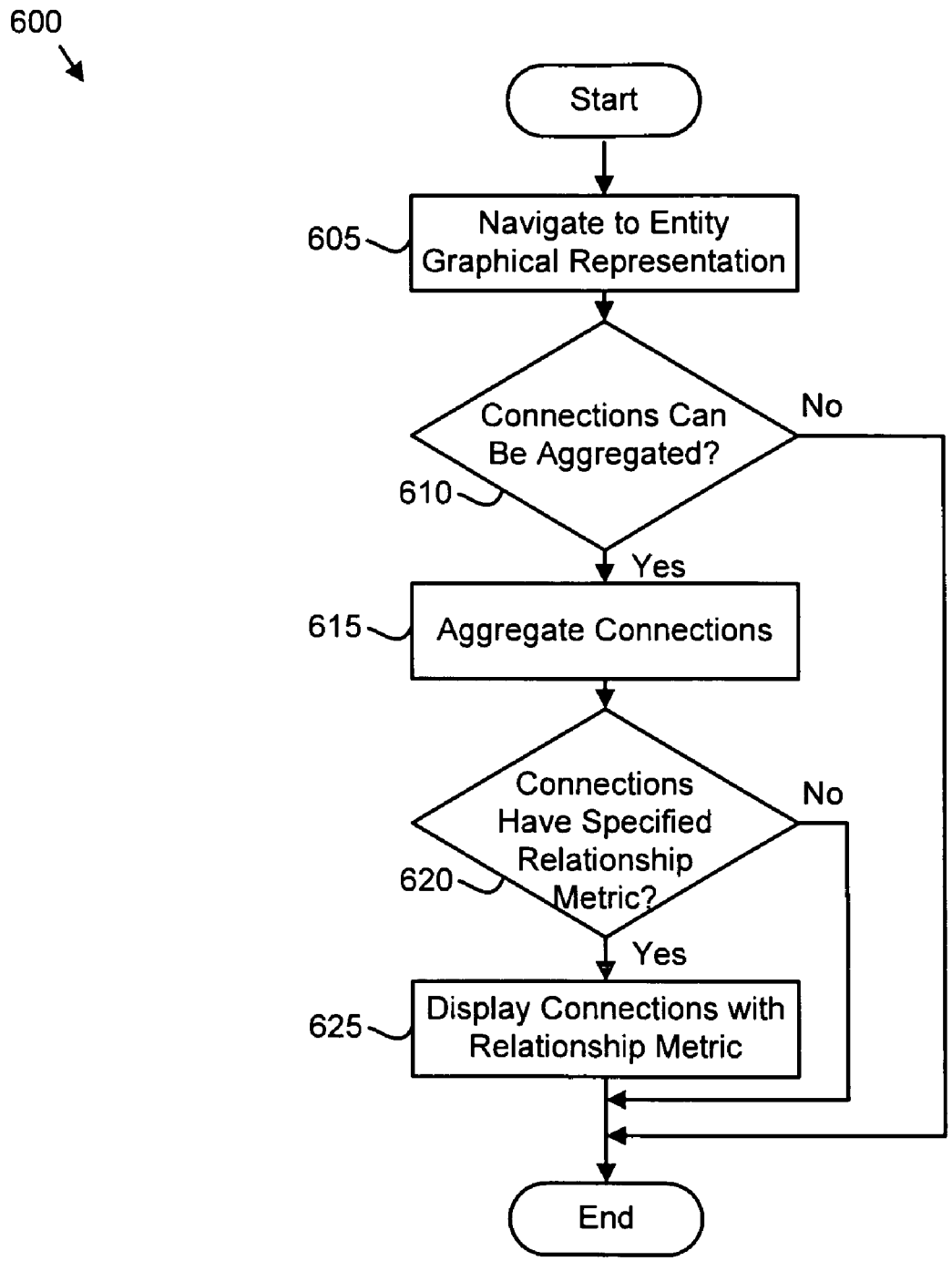
FIG. 6A is a schematic flow chart diagram illustrating one embodiment of a connection aggregation method of the present invention.

FIG. 6A is a schematic flow chart diagram illustrating one embodiment of a connection aggregation method 600 of the present invention. The method 600 substantially includes the steps to carry out the functions presented above with respect to the operation of the described method 500, apparatus 300, 400, and systems 100, 200, of FIGS. 1-5. In addition, the method 600 refers to elements of FIGS. 1-5, like numbers referring to like elements.

The method 600 begins and in one embodiment, the user navigates 605 to an entity graphical representation. The navigation may comprise selecting the entity graphical representation such as is described for step 515 of FIG. 5 and will be further described hereafter.

In one embodiment, the display module 315 determines 610 if the connections for one or more entities may be aggregated. The display module 315 may determine 610 the connections may be aggregated if the connections share a source entity and/or destination entity. If the display module 315 determines 610 the connections cannot be aggregated, the method 600 terminates. If the connections can be aggregated, the display module 315 may aggregate 615 the connections as will be illustrated hereafter.

In one embodiment, the display module 315 determines 620 if one or more of the connections that have a specified relationship metric. For example, the user may specify that the display module 315 display aggregated connections with a "priority connection" relationship metric that indicates high communications traffic. Alternatively, the user may specify that the display module 315 display aggregated connections with a "failed connection" relationship metric that indicates no communications traffic. If the display module 315 determines 620 there is no specified relationship metric or if no connections have the specified relationship metric, the method 600 terminates. Alternatively, if the display module 315 determines 620 there is a specified relationship metric and one or more connections have the specified relationship metric, the display module 315 displays 625 aggregated connections with information regarding the specified relationship metric and the method 600 terminates.

Figure 6B:
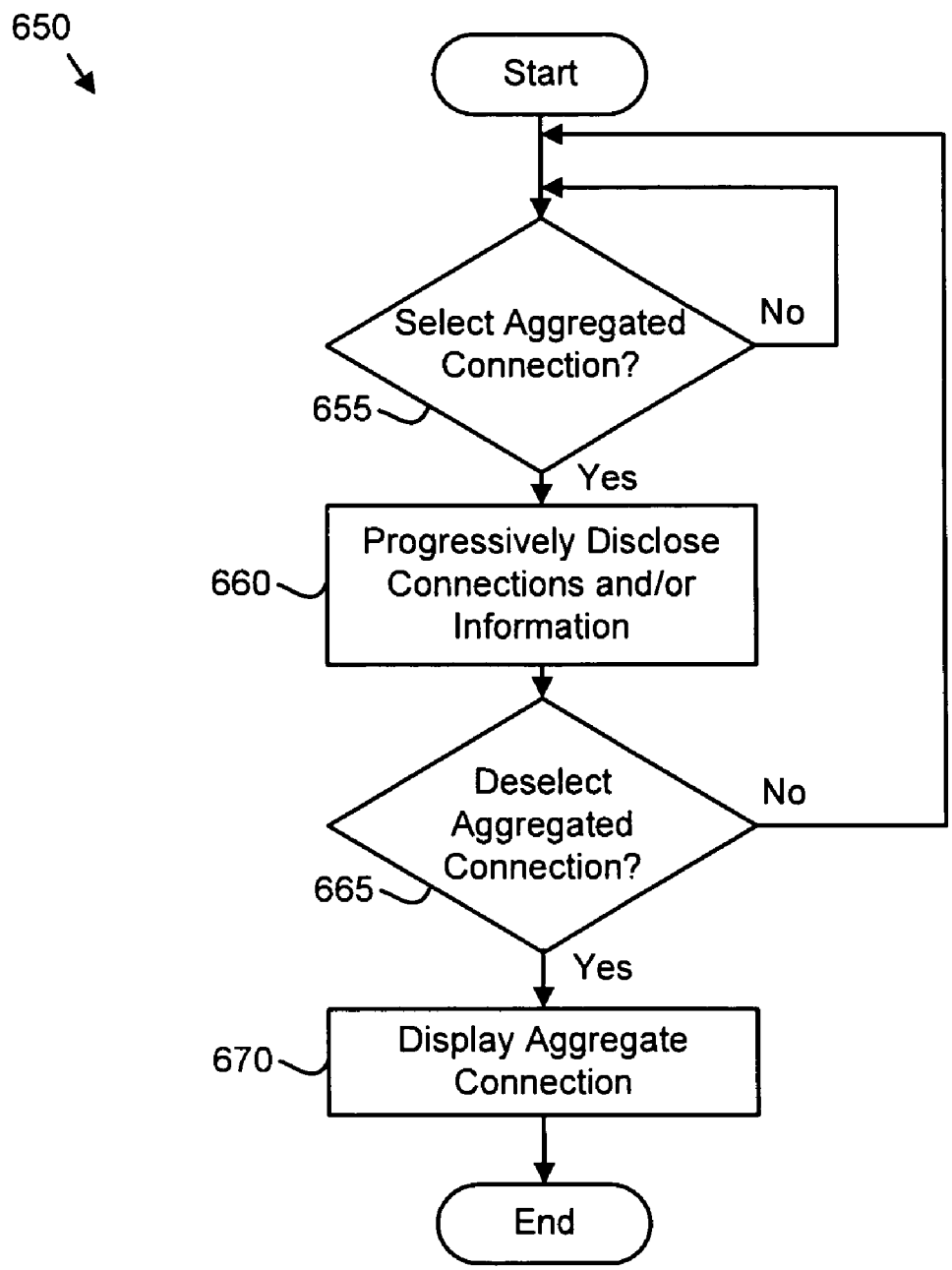
FIG. 6B is a schematic flow chart diagram illustrating one embodiment of a progressive aggregation disclosure method of the present invention.

FIG. 6B is a schematic flow chart diagram illustrating one embodiment of a progressive aggregation disclosure method 650 of the present invention. The method 600 refers to elements of FIGS. 1-6A, like numbers referring to like elements.

In one embodiment, the method 650 begins and the display module 315 determines 655 if the user selects an aggregated connection such as is described for the method 600 of FIG. 6A. The user may select the aggregated connection using a pointing device, a haptic device, a visual area-of-interest device, or the like. If the user does not select the aggregated connection, the display module 315 may continue to display 625 the aggregated connection while looping to determine if the user selects the aggregated connection.

If the display module 315 determines 655 that the user selects the aggregated connection, the display module 315 progressively discloses 660 information that is pertinent to the aggregated connection. In one embodiment, the display module 315 discloses un-aggregated connections. For example, if the aggregated connection included three connections, the display module 315 may display each of the three connections as disclosed connections.

Alternatively, the display module 315 may disclose 660 information relating to the disclosed connection, and/or information pertinent to the sub-connections. For example, if the disclosed connection is an aggregation of Fibre Channel connections, the display module 315 may disclose 660 that the connections are Fibre Channel connections.

The display module 315 further determines 665 if the user deselects the disclosed connections. If the user does not deselect the disclosed connections, the display module 315 may determine 655 if the user selects disclosed connections for further disclosure of additional aggregation. For example, a disclosed connection may comprise aggregated sub-connections. If the display module 315 determines 655 the user selects the disclosed connection, the display module 315 progressively discloses 660 the aggregated sub-connections by displaying the sub-connections.

In one embodiment, if the display module 315 determines 665 the user deselects the disclosed connection, the display module 315 may display 670 the aggregated connection and the method 650 terminates. The method 650 allows the user to progressively disclose the aggregation of connections.

Figure 7:
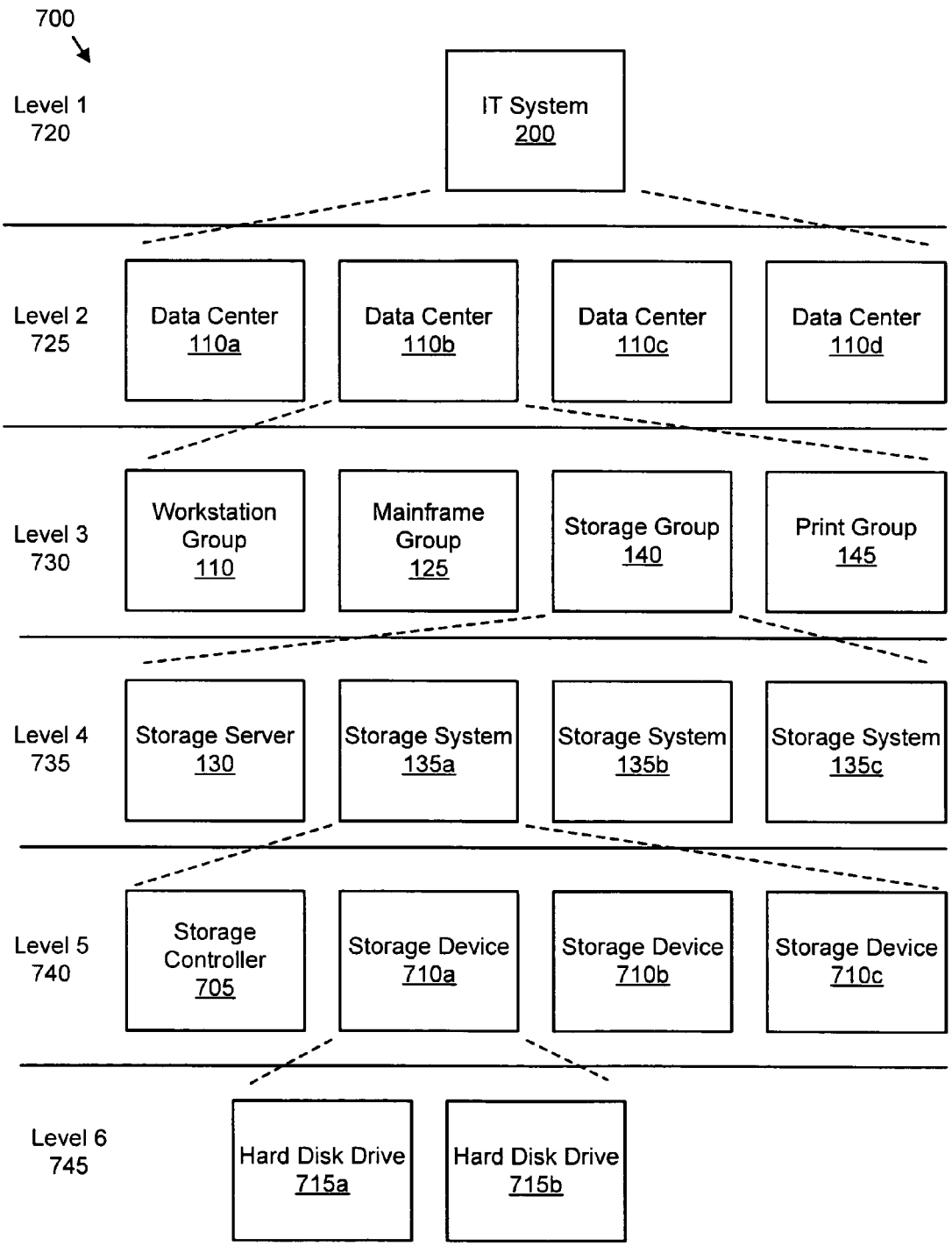
FIG. 7 is a schematic block diagram illustrating one embodiment of levels of the present invention.

FIG. 7 is a schematic block diagram illustrating one exemplary embodiment of levels 700 of the present invention. The description of the levels 700 refers to elements of FIGS. 1-6, like numbers referring to like elements. A plurality of levels 720, 725, 730, 735, 740, 745 is depicted. In addition, elements are depicted as assigned to each level 720, 725, 730, 735, 740, 745.

In the depicted embodiment, the organization module 305 establishes 505 a level 1 720, level 2 725, level 3 730, level 4 735, level 5 740, and level 6 745. The organization module 305 may further assign the information technology system 100 to the level 1 720. The information technology system 200 may be an entity with one or more sub-entities. As depicted, the sub-entities may be one or more data centers 100. The organization module 305 may assign the data centers 100 to the level 2 725.

Each data center 100 such as a second data center 100b may be an entity with one or more sub-entities. The sub-entities may be assigned to the level 3 730 and include the workstation group 110, mainframe group 125, the storage group 140, and the printer group 145. Each group 110, 125, 140, and 145 may also have sub-entities. For example, the storage group 140 is depicted with storage server 130 and storage system 135 sub-entities assigned to the level 4 735.

A storage system 135 such as the first storage system 135a may further include sub-entities. The sub-entities are assigned to the level 5 740 and are depicted as a storage controller 705 and one or more storage devices 710. In addition, a storage device 710 such as a first storage device 710a may also have sub-entities. The first storage device 710a sub-entities may be hard disk drives 715 and may be assigned to the level 6 745.

The objects and resources of the information technology system 200 are thus organized on a plurality of levels 700, allowing the user to drill down from a high level, abstracted view to easily view information disclosures with more detail regarding a sub-set of the system 200.

The user may employ the levels 700 to navigate between entities in the system 200. For example, the user may employ a tunneling movement to navigate from a first entity of the highest level such as the information technology system 200 of the level 1 720, to a second entity of the lowest level such as the first hard disk drive 715a of the level 6 745. The navigation module 325 may interpret the selection of the first entity with a specified keystroke or other selection mechanism as a directive for the tunneling movement.

Alternatively, the user may employ a diagonal movement to navigate from a first entity such as the work station group 110 of the level 3 730 to a second entity of a different level and entity class such as the storage system 135a of the level 4 735. The navigation module 325 may interpret a selection of the second entity as a directive for the diagonal movement.

In one embodiment, the user may employ a horizontal movement to navigate from a first entity such as the storage server 130 of the level 4 735 to a second entity on the same level such as the first storage system 135*a* of the level 4 735. The navigation module 325 may interpret a selection of the second entity as the directive for the horizontal movement.

The user may also employ a skip level movement to navigate from a first entity such as the storage group 140 of the level 3 730 to a second entity of a level other than an adjacent level such as the first storage device 710*a* of the level 5 740. The navigation module 325 may interpret a selection of the second entity with a keystroke as a directive for the skip level movement.

In one embodiment, the user may employ a vertical movement to navigate from a first entity such as the storage group 140 of the level 3 730 to a second entity of a different level and same entity class such as the storage server 130 of the level 4 735. The navigation module 325 may interpret a selection of the second entity as the directive for the vertical movement.

Figure 8:
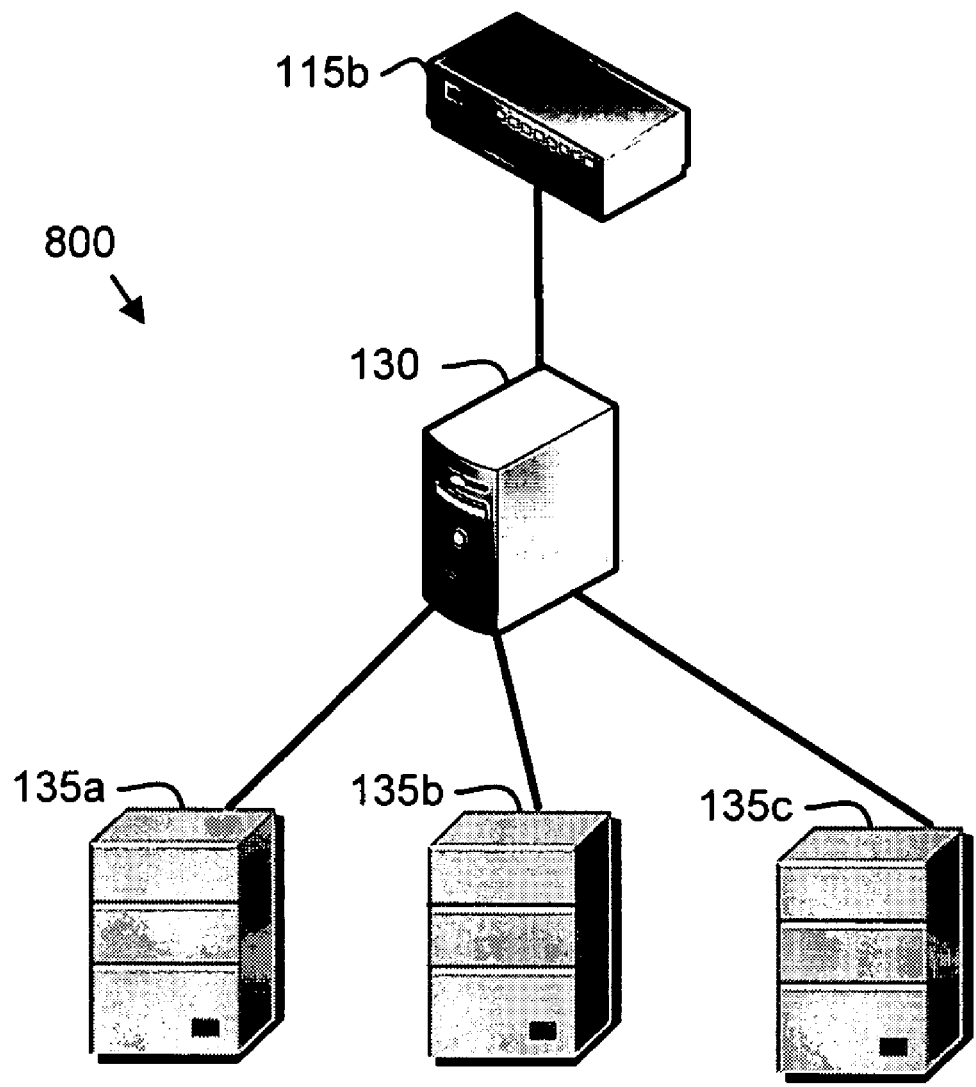
FIG. 8 is a schematic block diagram illustrating one embodiment of a contextual graphical representation of the present invention.

FIG. 8 is a schematic block diagram illustrating one embodiment of a contextual graphical representation 800 of the present invention. The representation 800 may represent the storage group 140 of FIG. 1. In addition, the description of the representation 800 refers to elements of FIGS. 1-7, like numbers referring to like elements.

The user may select an entity graphical representation of the storage group 140. The display module 315 may display 515 the storage group 140 by showing the storage server 130 of the storage group 140 in communication with the storage systems 135 of the storage group 140. In one embodiment, the display module 315 displays the level 4 entity graphical representation of the storage group 140 as described in FIG. 7.

In addition, the display module 315 may show the second bridge 115*b* in communication with the storage server 130. Although the second bridge 115*b* is not included in the storage group 140, the display module 315 displays 515 the second bridge 115*b* as the second bridge 115*b* is an adjacent entity in relationship to the storage group 140. Displaying the second bridge 115*b* preserves the context of the storage group 140 with the data center 100. The storage server 130, storage systems 135, second bridge 115*b*, and connections between objects comprise the information environment.

Figure 9:
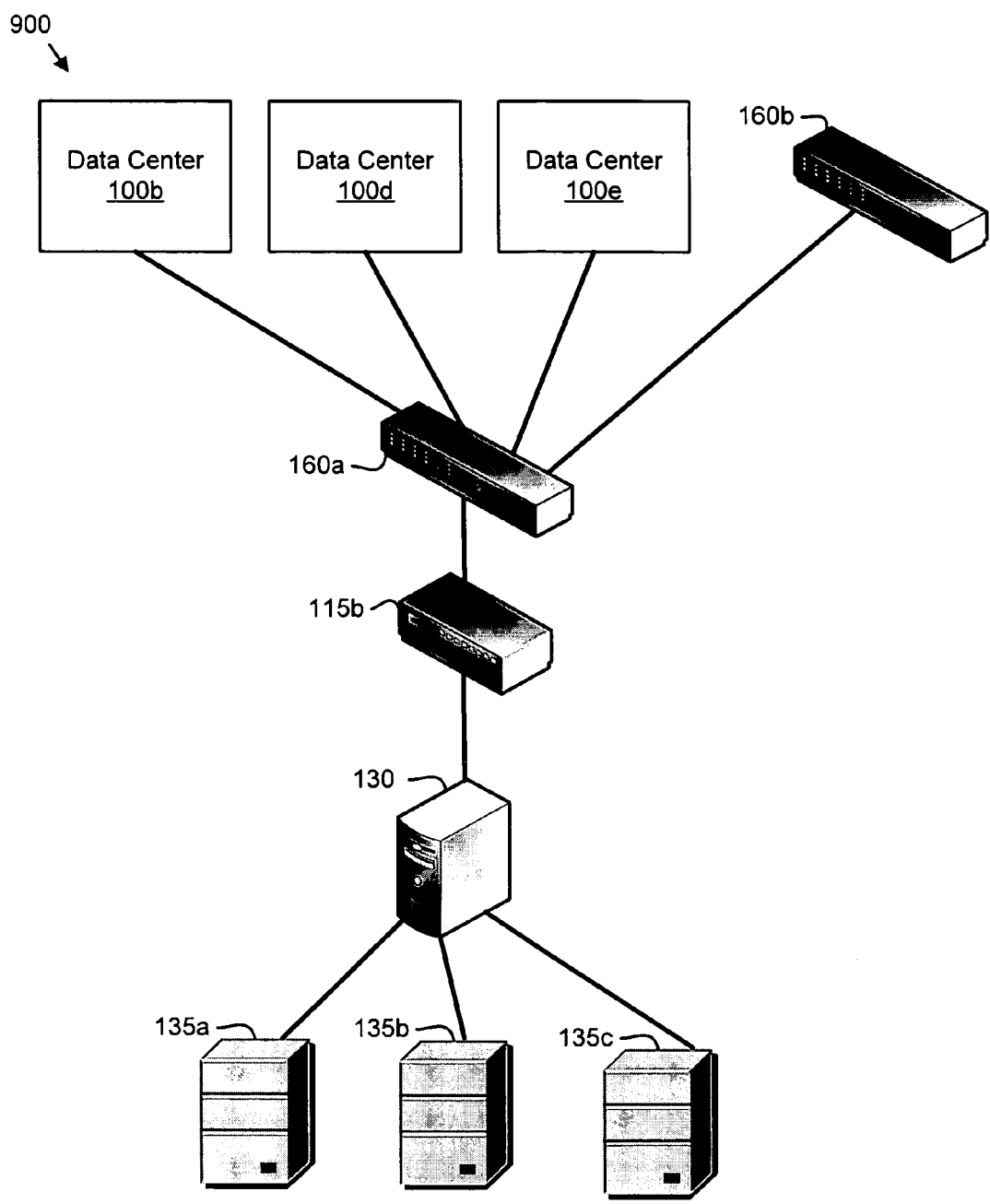
FIG. 9 is a schematic block diagram illustrating one alternate embodiment of a contextual graphical representation of the present invention.

FIG. 9 is a schematic block diagram illustrating one alternate embodiment of a contextual graphical representation 900 of the present invention. The representation 900 may be an alternate embodiment of the representation 800 of FIG. 8 and may represent the storage group 140 of FIG. 1. In addition, the description of the representation 900 refers to elements of FIGS. 1-8, like numbers referring to like elements.

The representation 900 includes additional context information for the storage group 140. The second bridge 115*b* is shown in communication with the first router 160*a* of FIG. 2, and through the first router 160*a* with the second, fourth, and fifth data centers 100*b*, 100*d*, 100*e* and the second router 160*b* of FIG. 2. The additional contextual information may be used to troubleshoot problems between widely separated entities.

Figure 10A:
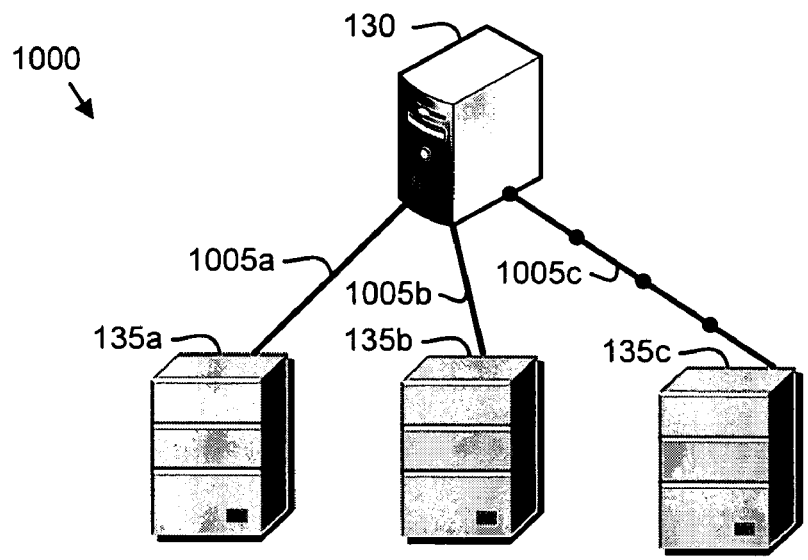
FIGS. 10A-10B are drawings illustrating one embodiment of an aggregated connection of the present invention.

FIG. 10A is a drawing illustrating one embodiment of an aggregated connection 1000 that is exemplary of the connection aggregation method 600 of FIG. 6. The description of the connection 1000 refers to elements of FIGS. 1-9, like numbers referring to like elements.

The storage group 140 of FIG. 1 is depicted as if displayed 515 by the display module 315. Connections 1005 are displayed between the storage server 130 and the storage systems 135. A third connection 1005*c* is emphasized with dots to indicate a "priority connection" relationship metric.

Figure 10B:
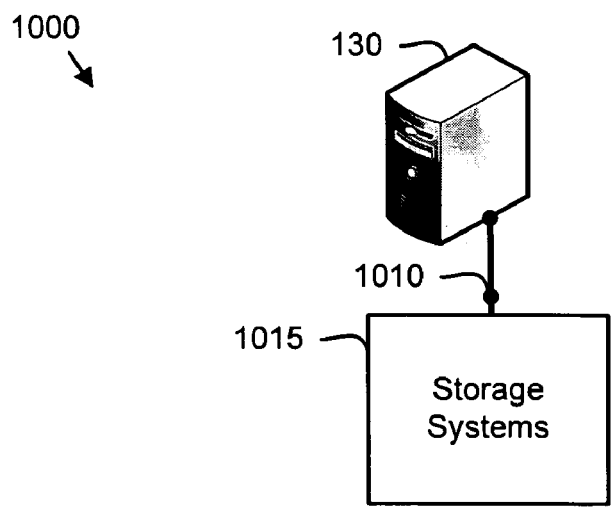

FIG. 10B is the drawing of FIG. 10A, illustrating the aggregated connection 1000 of FIG. 10A. The description of the connection 1000 refers to elements of FIGS. 1-10A, like numbers referring to like elements.

In one embodiment, the display module 315 determines 610 that the connections 1005 of FIG. 10A can be aggregated. For example, the display module 315 may determine 610 that the connections 1005 can be aggregated as each connection 1005 shares a source, the storage server 130, and each connection 1005 shares a common type of destination, the storage systems 135. The display module 315 aggregates 615 the connections 1005 as the aggregated connection 1010. In addition, the display module 315 may aggregate the storage systems 135 as a single block 1015.

In one embodiment, the display module 315 further determines 620 if the connections 1005 of FIG. 10A have a specified relationship metric such as the "priority connection" relationship metric of the third connection 1005*c*. Because the third connection 1005*a* has the "priority connection" relationship metric, the display module 315 displays the "priority connection" relationship metric of the third connection 1005*c*.

Figure 10C:
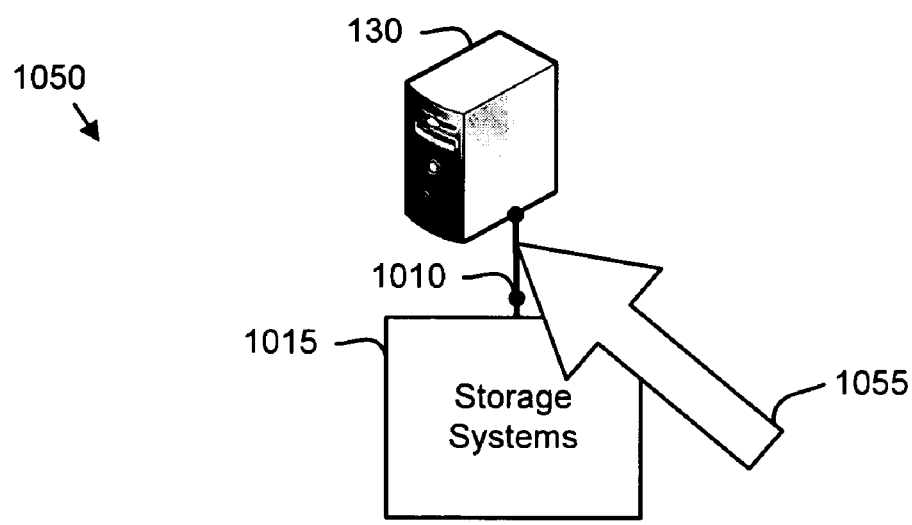
FIGS. 10C-10E are drawings illustrating one embodiment of connection de-aggregation of the present invention.
Figure 10D:
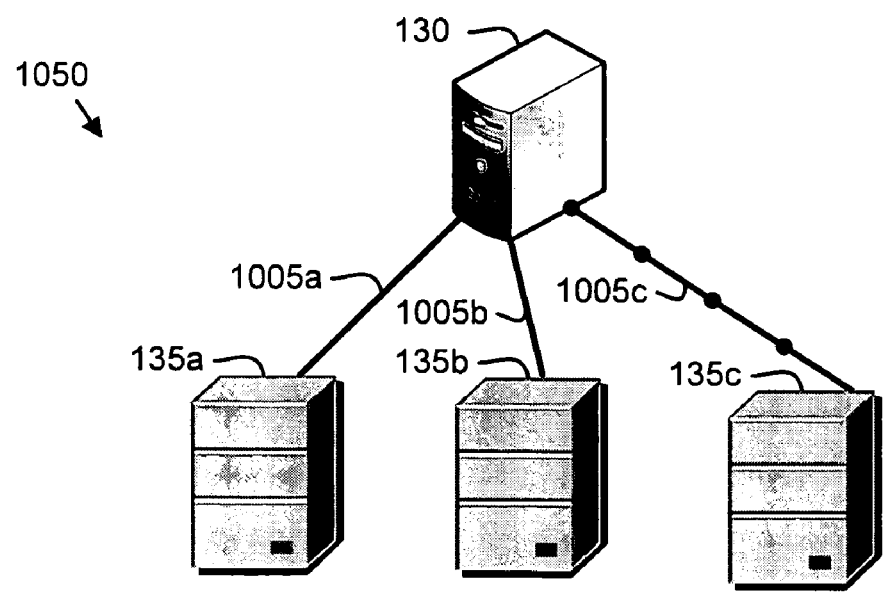

FIGS. 10C-10D are drawings illustrating one embodiment of connection de-aggregation 1050 as described for the progressive aggregation disclosure method 650 of FIG. 6B. The description of the connection de-aggregation 1050 refers to elements of FIGS. 1-10B, like numbers referring to like elements.

The storage group 140 of FIG. 10B is shown as if displayed by the display module 315. In addition, a cursor 1055 is shown positioned over the aggregated connection 1010. The user may select the aggregated connection 1010 with the cursor 1055.

FIG. 10D shows the storage group 140 of FIG. 10C with the connections 1005 of the aggregated connection 1010 disclosed in response to selection by the user. Thus the user may disclose details of aggregated connections 1010.

Figure 10E:
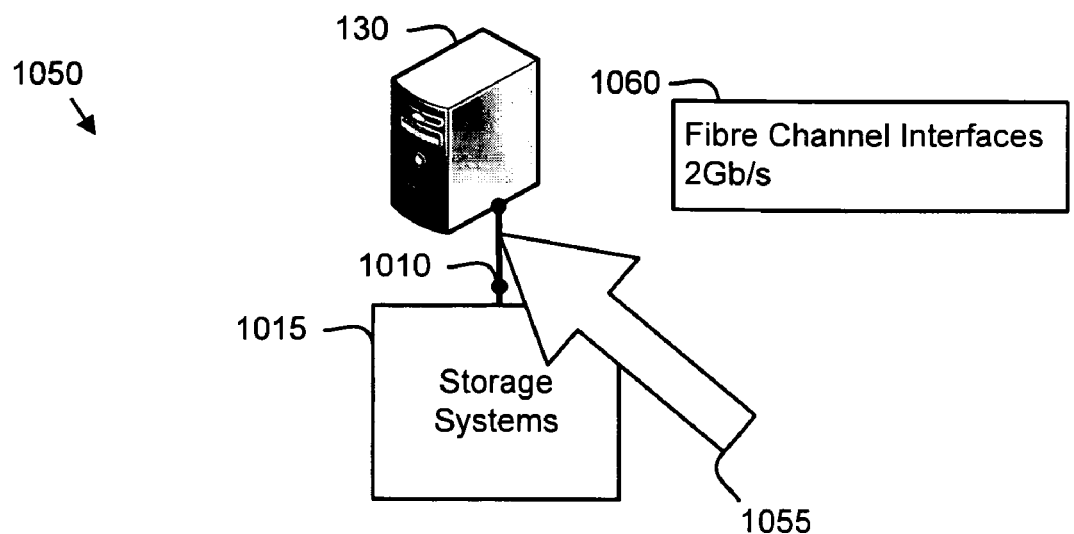

FIG. 10E shows the storage group 140 of FIG. 10C with information relating to the aggregated connection 1010 disclosed in an expanded information window 1060. The expanded information window 1060 displays information about the aggregated connection 1010. In a prophetic example, the expanded information window 1060 is depicted as indicating the aggregated connection 1010 is a Fibre Channel connection transmitting data at two gigabits per second (2 Gb/s).

Figure 11:
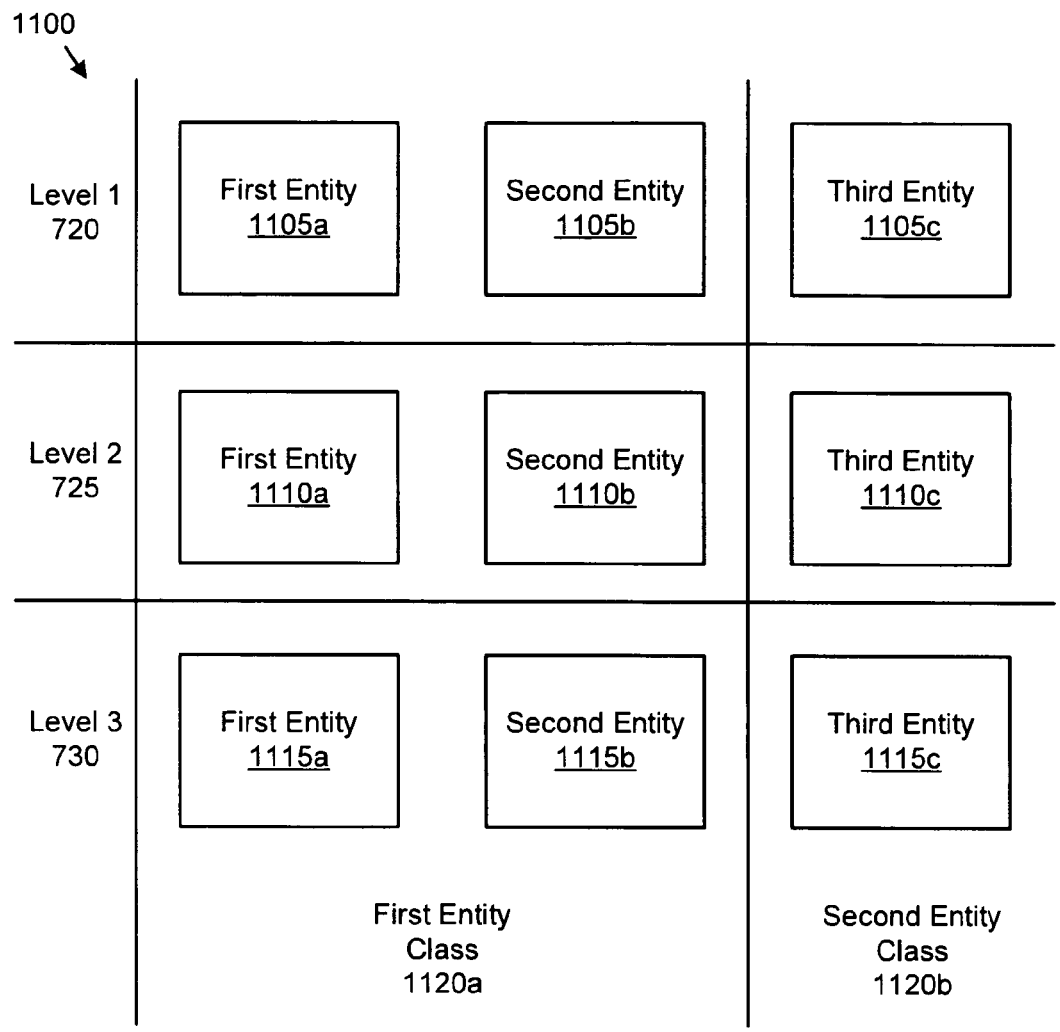
FIG. 11 is a schematic block diagram illustrating one embodiment of entity classes of the present invention.

FIG. 11 is a schematic block diagram illustrating one embodiment of entity classes 1100 of the present invention. The entity classes 1100 are composed of objects and resources such as are depicted in FIGS. 1 and 2. In addition, the description of the entity classes 1100 refers to elements of FIGS. 1-10B, like numbers referring to like elements. The level 1 720, level 2 725, and level 3 730 of FIG. 7 are shown with one or more entities 1105 assigned to the level 1 720, one or more entities 1110 assigned to the level 2 725, and one or more entities 1115 assigned to the level 3 730.

Each entity 1105 of the level 1 720 has a corresponding sub-entity, the entity 1110 of the level 2 725. In addition, each entity 1110 of the level 2 725 has a corresponding sub-entity, the entity 1115 of the level 3 730. Although for simplicity each entity 1105, 1110 of the level 1 720 and the level 2 725 is depicted with only one sub-entity, each entity 1105, 1110, 1115 may have any number of sub-entities.

The first and second entities 1105*a*, 1110*a*, 1115*a*, 1105*b*, 1110*b*, 1115*b* are organized as a first entity class 1120*a* while the third entity 1105*c*, 1110*c*, 1115*c* is organized as a second entity class 1120*b*. Each entity class 1120 may include like entities 1105, 1110, 1115. For example, the mainframes 120 of FIG. 1 may comprise an entity class 1120. As shown, an entity class 1120 may extend across one or more levels 700.

In one embodiment, the entity classes 1120 are employed to aid the user in navigating between entities 1105, 1110, 1115. For example, user may employ a skip level movement wherein the navigation bypasses an entity class 1120.

Figure 12:
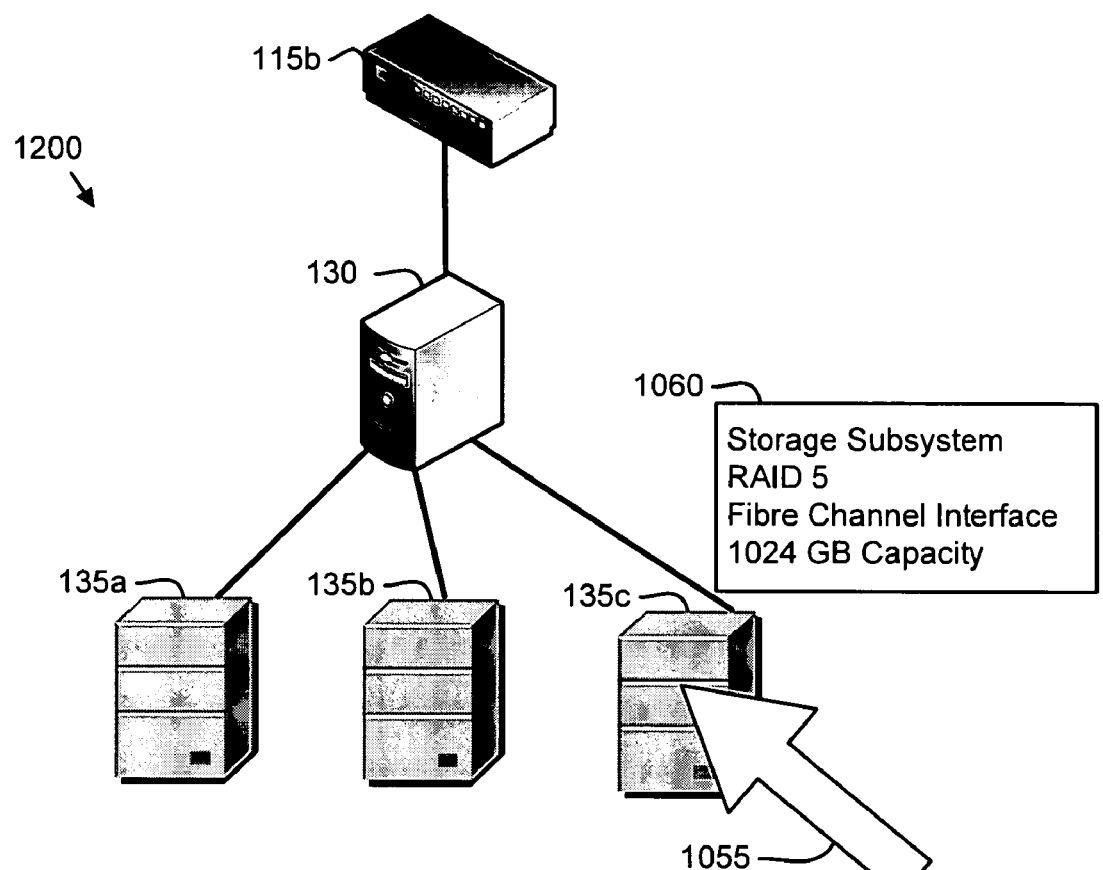
FIG. 12 is a schematic block diagram illustrating one embodiment of expanded information of the present invention.

FIG. 12 is a schematic block diagram illustrating one embodiment of expanded information 1200 of the present invention. The storage group 140 is shown as if displayed 515 by the display module 315 such as on the video display 435. In addition, the cursor 11055 is shown positioned over the third storage system 135c. The description also refers to elements of FIGS. 1-11, like numbers referring to like elements. The entities 1105, 1110, 1115 of FIG. 11 are collective referred to as the entity 1105

The cursor 1055 positioned over the third storage system 135c is a cursor hover. The cursor hover may be one embodiment of a user information query. The modification module 320 may modify 520 the information environment by providing expanded information about an entity 1105 in response to the user information query although the entity 1105 is not explicitly selected.

For example, an expanded information window 1060 is depicted as displayed by the modification module 320 in response to the cursor hover. The expanded information window 1060 displays expanded information about the third storage system 135c. The expanded information window 1060 is depicted as specifying that the third storage system 135c is a storage subsystem, and is further classified as a redundant array of independent drives ("RAID") 5 storage subsystem with a Fibre Channel interface and one thousand twenty-four gigabytes (1024 GB) of storage capacity.

In an alternate embodiment, the user information query may be in response to an indication such as a voice command, a visual area-of-interest indication, and/or a haptic indication. For example, the modification module 320 may modify the information environment to display the expanded information window 1060 in response to the user holding a finger near an icon of the third storage system 135c on the video display 435.

The embodiment of the present invention discloses information about one or more entities 1105 of the information technology system 200 appropriate to a selected level 700 and with context information for related and/or connected entities 1105. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to disclose information, the apparatus comprising:

a semiconductor device storing executable code;

a processor executing the executable code, the executable code comprising an organization module establishing a plurality of levels of graphical information for an information technology system comprising a plurality of entities and a plurality of connections between entities, wherein each entity is selected from an object comprising at least one physical device in a data center and a resource comprising a logical portion of an object and represents one or more sub-entities and is assigned to at least one level and at least one entity class comprising similar objects, and each level with a specified granularity of entity information, the granularities ranging from a least fine granularity with high level information and the entity having at least one sub-entity to a finest granularity wherein the entity has no sub-entity;

an assignment module assigning an entity graphical representation to each entity for each assigned level;

a navigation module navigating from a first entity graphical representation to a selected entity graphical representation, the navigation comprising a diagonal navigation moving from the first entity graphical representation of a first level and a first entity class to the selected entity graphical representation of a second level and a second entity class;

a display module displaying the selected entity graphical representation with the entity information granularity for a finer granularity level and a context graphical representation of each entity with a direct relationship with the selected entity with the entity information granularity for a less fine granularity level, the selected entity graphical representation and context graphical representation comprising an information environment and displaying a plurality of connections for a group of entities, each connection with a specified relationship metric, as a single aggregated connection and a single aggregated information disclosure of the specified relationship metric, the specified relationship metric selected from a priority connection and a failed connection; and a modification module progressively modifying the information environment in response to a user request.

2. The apparatus of claim 1, wherein the levels comprise a global level with an entity information granularity that provides abstracted information for a group of entities and a properties level configured with an entity information granularity that provides detailed information about each entity and minimal abstraction.

3. The apparatus of claim 2, wherein the levels comprise an ambient level with an entity information granularity that provides abstracted information for groups of entities within a specified entity class.

4. The apparatus of claim 3, wherein the levels comprise an orbital level with an entity information granularity that provides abstracted information for a group of entities and the immediate information environment.

5. The apparatus of claim 4, wherein the levels comprise a context level with an entity information granularity that provides abstracted information for individual entities and the immediate information environment where the immediate information environment may include both grouped and individual entities.

6. The apparatus of claim 5, wherein the levels comprise a case level with an entity information granularity that displays connections between entities in a group.

7. The apparatus of claim 1, wherein the navigation further comprises a vertical movement from the first entity graphical representation to a second entity graphical representation of a different level and same entity class.

8. The apparatus of claim 1, wherein the navigation further comprises a horizontal movement from the first entity graphical representation to a second entity graphical representation of the same level.

9. The apparatus of claim 1, wherein the navigation further comprises a skip level movement bypassing a level of granularity.

10. The apparatus of claim 1, wherein the navigation further comprises a skip level movement bypassing an entity class.

11. The apparatus of claim 1, wherein the navigation further comprises a tunneling movement between the first entity graphical representation of a highest level of granularity and a second entity graphical representation of a lowest level of granularity.

12. The apparatus of claim 1, the display module further displaying expanded information on an entity in response to a user information query.

13. The apparatus of claim 12, wherein the user information query is selected from a cursor hover, a voice command, a visual area-of-interest indication, or a haptic indication.

14. A semiconductor device storing executable code executed by a processor to perform an operation to disclose information, the operation comprising:
 establishing a plurality of levels of graphical information for an information technology system comprising a plurality of entities and a plurality of connections between entities, wherein each entity is selected from an object comprising at least one physical device in a data center and a resource comprising a logical portion of an object and represents one or more sub-entities and is assigned to at least one level and at least one entity class comprising similar objects, each level with a specified granularity of entity information, the granularities ranging from a least fine granularity with high level information and the entity having at least one sub-entity to a finest granularity wherein the entity has no sub-entity;
 assigning an entity graphical representation to each entity for each assigned level wherein the entity graphical representation comprises at least one icon;
 navigating from a first entity graphical representation to a selected entity graphical representation, the navigation comprising a diagonal navigation moving from the first entity graphical representation of a first level and a first entity class to the selected entity graphical representation of a second level and a second entity class;
 displaying the selected entity graphical representation with the entity information granularity for a finer granularity level and a context graphical representation of each entity with a direct relationship with the selected entity with the entity information granularity for a less fine granularity level, the selected entity graphical representation and context graphical representation comprising an information environment and displaying a plurality of connections for a group of entities, each connection with a specified relationship metric, as a single aggregated connection and a single aggregated information disclosure of the specified relationship metric, the specified relationship metric selected from a priority connection and a failed connection; and
 progressively modifying the information environment in response to a user request.

15. The semiconductor device of claim 14, wherein the levels comprise a global level with an entity information granularity that provides abstracted information for a group of entities and a properties level configured with an entity information granularity that provides detailed information about each entity and minimal abstraction.

16. The semiconductor device of claim 15, wherein the levels comprise an ambient level with an entity information granularity that provides abstracted information for groups of entities within a specified entity class.

17. The semiconductor device of claim 16, wherein the levels comprise an orbital level with an entity information granularity that provides abstracted information for a group of entities and the immediate environment.

18. The semiconductor device of claim 17, wherein the levels comprise a context level with an entity information granularity that provides abstracted information for individual entities and the immediate information environment.

19. The semiconductor device of claim 18, wherein the levels comprise a case level with an entity information granularity that displays connections between entities in a group.

20. The semiconductor device of claim 14, wherein the navigation further comprises a vertical movement between the first entity graphical representation to a second entity graphical representation of a different level and same entity class.

21. The semiconductor device of claim 14, wherein the navigation further comprises a tunneling movement between the first entity graphical representation of a highest level of granularity and a second entity graphical representation of a lowest level of granularity.

22. The semiconductor device of claim 14, wherein the navigation further comprises a horizontal movement from the first entity graphical representation to a second entity graphical representation of the same level.

23. The semiconductor device of claim 14, wherein the navigation further comprises a skip level movement bypassing a level of granularity.

24. The semiconductor device of claim 14, wherein the navigation further comprises a skip level movement bypassing an entity class.

25. The semiconductor device of claim 14, further comprising an operation to display a plurality of connections for a group of entities as an aggregated connection and aggregated information disclosure.

26. The semiconductor device of claim 25, further comprising an operation to display a relationship metric of a priority connection in the aggregated connection.

27. The semiconductor device of claim 25, further comprising an operation to display a plurality of de-aggregated connections for a selected aggregated connection.

28. A system to disclose information, the system comprising:
 an information technology system configured to process data;
 a computer in communication with the information technology system and comprising a semiconductor device storing executable code and a processor executing the executable code, the executable code comprising:
  an organization module establishing a plurality of levels of graphical information for an information technology system comprising a plurality of entities and a plurality of connections between entities, wherein each entity is selected from an object comprising at least one physical device in a data center and a resource comprising a logical portion of an object and represents one or more sub-entities that are objects and/or resources and each entity is assigned to at least one level and at least one entity class comprising similar objects, each level with a specified granularity of entity information, the granularities ranging from a least fine granularity with high level information and the entity having at least one sub-entity to a finest granularity wherein the entity has no sub-entity;
  an assignment module assigning an entity graphical representation to each entity for each assigned level wherein the entity graphical representation comprises at least one icon;

a navigation module navigating from a first entity graphical representation to a selected entity graphical representation, the navigation comprising a diagonal navigation moving from the first entity graphical representation of a first level and a first entity class to the selected entity graphical representation of a second level and a second entity class;

a display module displaying the selected entity graphical representation with the entity information granularity for a finer granularity level and a context graphical representation of each entity with a direct relationship with the selected entity with the entity information granularity for a less fine granularity level, the selected entity graphical representation and context graphical representation comprising an information environment and displaying a plurality of connections for a group of entities, each connection with a specified relationship metric, as a single aggregated connection and a single aggregated information disclosure of the specified relationship metric, the specified relationship metric selected from a priority connection and a failed connection;

a modification module progressively modifying the information environment in response to a user request; and a navigation module navigating to an entity graphical representation of the information environment.

29. The system of claim 28, wherein the navigation further comprises a horizontal movement from the first entity graphical representation to a second entity graphical representation of the same level, a skip level movement bypassing a level of granularity, and a tunneling movement between the first entity graphical representation of a highest level of granularity and a second entity graphical representation of a lowest level of granularity.

30. A method for deploying computer infrastructure, comprising integrating computer-readable code into a computing system, wherein the code in combination with the computing system is capable of performing the following:

establishing a plurality of levels of graphical information for an information technology system comprising a plurality of entities and a plurality of connections between entities, wherein each entity is selected from an object comprising at least one physical device in a data center and a resource comprising a logical portion of an object and represents one or more sub-entities and is assigned to at least one level and at least one entity class comprising similar objects, each level is configured with a specified granularity of entity information, the granularities ranging from a least fine granularity with high level information and the entity having at least one sub-entity to a finest granularity wherein the entity has no sub-entity, and wherein the levels comprise a global level configured with an entity information granularity that provides abstracted information for a group of entities, and an orbital level configured with an entity information granularity that provides abstracted information for a group of entities and the immediate environment;

assigning an entity graphical representation to each entity for each assigned level wherein the entity graphical representation comprises at least one icon;

navigating from a first entity graphical representation to a selected entity graphical representation, the navigation comprising a diagonal navigation moving from the first entity graphical representation of a first level and a first entity class to the selected entity graphical representation of a second level and a second entity class;

displaying the selected entity graphical representation with the entity information granularity for a finer granularity level and a context graphical representation of each entity with a direct relationship with the selected entity with the entity information granularity for a less fine granularity level, the selected entity graphical representation and context graphical representation comprising an information environment and displaying a plurality of connections for a group entities, each connection with a spec i tied relationship metric, as a single aggregated connection and a single aggregated information disclosure of the specified relationship metric, the specified relationship metric selected from a priority connection and a failed connection; and progressively modifying the information environment in response to a user request.

31. An apparatus to disclose information, the apparatus comprising:

a semiconductor device storing executable code;

a processor executing the executable code, the executable code comprising means for establishing a plurality of levels of graphical information for an information technology system comprising a plurality of entities and a plurality of connections between entities, wherein each entity is selected from an object comprising at least one physical device in a data center and a resource comprising a logical portion of an object and represents one or more sub-entities and is assigned to at least one level and at least one entity class comprising similar objects, each level with a specified granularity of entity information, the granularities ranging from a least fine granularity with high level information and the entity having at least one sub-entity to a finest granularity wherein the entity has no sub-entity, and wherein the levels comprise a global level with a entity information granularity that provides abstracted information for a group of entities, a properties level with an entity information granularity that provides detailed information about each entity and minimal abstraction, an ambient level with an entity information granularity that provides abstracted information for groups of entities within a given entity class, an orbital level with an entity information granularity that provides abstracted information for a group of entities and the immediate environment, a context level with an entity information granularity that provides abstracted information for entities in a group of entities, and a case level with an entity information granularity that displays connections between entities in a group;

means for assigning an entity graphical representation to each entity for each assigned level wherein the entity graphical representation comprises at least one icon;

means for navigating from a first entity graphical representation to a selected entity graphical representation, the navigation comprising a diagonal navigation moving from the first entity graphical representation of a first level and a first entity class to the selected entity graphical representation of a second level and a second entity class;

means for displaying the selected entity graphical representation with the entity information granularity for a finer granularity level and a context graphical representation of each entity with a direct relationship with the selected entity with the entity information granularity for a less fine granularity level, the selected entity graphical representation and context graphical representation comprising an information environment and displaying a plurality of connections for a group of entities, each connection with a specified relationship metric, as a single aggregated connection and a single aggregated information disclosure of the specified relationship metric, the specified relationship metric selected from a priority connection arid a failed connection;

means for progressively modifying the information environment in response to a user request; and the navigating means further navigating to a graphical representation of the information environment.

32. The apparatus of claim 1, wherein the selected graphical representation is determined from an area-of-interest where a user is looking on a screen.

* * * * *